US008356012B2

(12) United States Patent
Stapleton et al.

(10) Patent No.: US 8,356,012 B2
(45) Date of Patent: Jan. 15, 2013

(54) MANAGEMENT OF MULTIMEDIA CONTENT

(75) Inventors: James Patrick Stapleton, Plano, TX (US); James Anthony Gewecke, Dallas, TX (US); Justin Nicholas Marcucci, Chester, NJ (US); Lee Culver, Carrollton, TX (US); David James Krantz, Santa Monica, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 471 days.

(21) Appl. No.: 12/333,742

(22) Filed: Dec. 12, 2008

(65) Prior Publication Data
US 2009/0287651 A1 Nov. 19, 2009

Related U.S. Application Data

(60) Provisional application No. 61/127,633, filed on May 14, 2008.

(51) Int. Cl.
*G06F 17/30* (2006.01)
(52) U.S. Cl. .............. 707/640; 707/706; 707/783
(58) Field of Classification Search .......... 707/706, 707/999.2, 783; 706/12–14
See application file for complete search history.

(56) References Cited

U.S. PATENT DOCUMENTS

| 5,680,558 A | 10/1997 | Hatanaka et al. |
| 6,944,629 B1 | 9/2005 | Shioi et al. |
| 7,058,641 B1 * | 6/2006 | Franz ................................. 1/1 |
| 2003/0001016 A1 * | 1/2003 | Fraier et al. ............ 235/462.03 |
| 2004/0215608 A1 * | 10/2004 | Gourlay ............................ 707/3 |
| 2006/0287990 A1 | 12/2006 | Yoon |
| 2007/0192802 A1 * | 8/2007 | Chen et al. ....................... 725/59 |
| 2007/0216761 A1 * | 9/2007 | Gronner et al. ............ 348/14.02 |
| 2007/0250533 A1 | 10/2007 | Huang |
| 2007/0276855 A1 | 11/2007 | Huang |
| 2007/0288836 A1 * | 12/2007 | Partovi ....................... 715/500.1 |
| 2008/0189293 A1 * | 8/2008 | Strandel et al. ................. 707/10 |
| 2008/0201437 A1 * | 8/2008 | Ludwig et al. ................ 709/206 |
| 2008/0270978 A1 * | 10/2008 | Leung ........................... 717/106 |
| 2009/0006335 A1 * | 1/2009 | Prager ............................... 707/3 |
| 2009/0132520 A1 * | 5/2009 | Nemeth et al. ..................... 707/5 |
| 2009/0183222 A1 * | 7/2009 | White et al. .................. 725/132 |
| 2009/0300671 A1 * | 12/2009 | Scott et al. ...................... 725/27 |

OTHER PUBLICATIONS

Youtube webpage, downloaded from http://youtube.com/watch?v=zZHrbjhwKik&feature=rec-HM-fresh+div on Dec. 9, 2008.

* cited by examiner

*Primary Examiner* — Robert Beausoliel, Jr.
*Assistant Examiner* — Noosha Arjomandi

(57) ABSTRACT

Disclosed are method and apparatus for managing multimedia content. The uniform resource locators of multimedia content accessed via the Internet are saved in collections stored in the database of a multimedia access system, which is shared by multiple users via individual user accounts. Collections may be copied from one user account to another user account, e-mailed, and posted on a website. Collections in the database may be searched by keywords associated with the collections.

23 Claims, 10 Drawing Sheets

MANAGEMENT OF MULTIMEDIA CONTENT

This application claims the benefit of U.S. Provisional Application No. 61/127,633 filed May 14, 2008, which is incorporated herein by reference.

BACKGROUND OF THE INVENTION

The present invention relates generally to management of computer files, and more particularly to collection, storage, and exchange of multimedia content.

The Internet has enabled users to access vast quantities of information. Previously, available information was primarily stored on network servers as data files, word documents, and graphical images. A user would typically access a specific network server (such as a specific webserver known to the user) and download the information onto his local computer, such as a personal computer (PC). As information and telecommunications technology has advanced, mechanisms for more complex information processing have developed:

- Available information has been evolving from static files to multimedia content, including streaming audio and video. Websites primarily focussed on providing multimedia content have become popular.
- Powerful search engines have permitted users to access information from a vast array of sources (not specifically known to the user).
- High-speed processors, high-speed memory, and large disk drives have become sufficiently inexpensive that low cost PCs may function as multimedia servers.
- Low-cost digital audio and video recorders have become widely available.
- Hi-speed, bi-directional communication links (for example, digital subscriber line, cable, and fiber optic) have been deployed to the customers premises.

These developments have enabled individual users to also become providers of multimedia content. Users may upload multimedia content, for example, onto commercial webservers or host private webservers. From simply playing multimedia content, users have become actively involved in producing, sharing, and exchanging multimedia content. Online social networks have further fostered the popularity of these activities. What is needed are method and apparatus for efficiently managing multimedia content.

BRIEF SUMMARY OF THE INVENTION

In an embodiment of the invention, uniform resource locators of multimedia content are saved in collections stored in the database of a multimedia access system. Users access the multimedia access system via individual user accounts, and collections are assigned to user accounts. A collection my be copied from a first user account to a second user account, e-mailed to a user, and posted on a website. Collections stored in the database may be searched by via collection search terms.

These and other advantages of the invention will be apparent to those of ordinary skill in the art by reference to the following detailed description and the accompanying drawings.

BRIEF DESCRIPTION OF THE DRAWINGS

FIG. 8C summarizes the set of operations which may be performed on a public collection.

DETAILED DESCRIPTION

Figure 1:
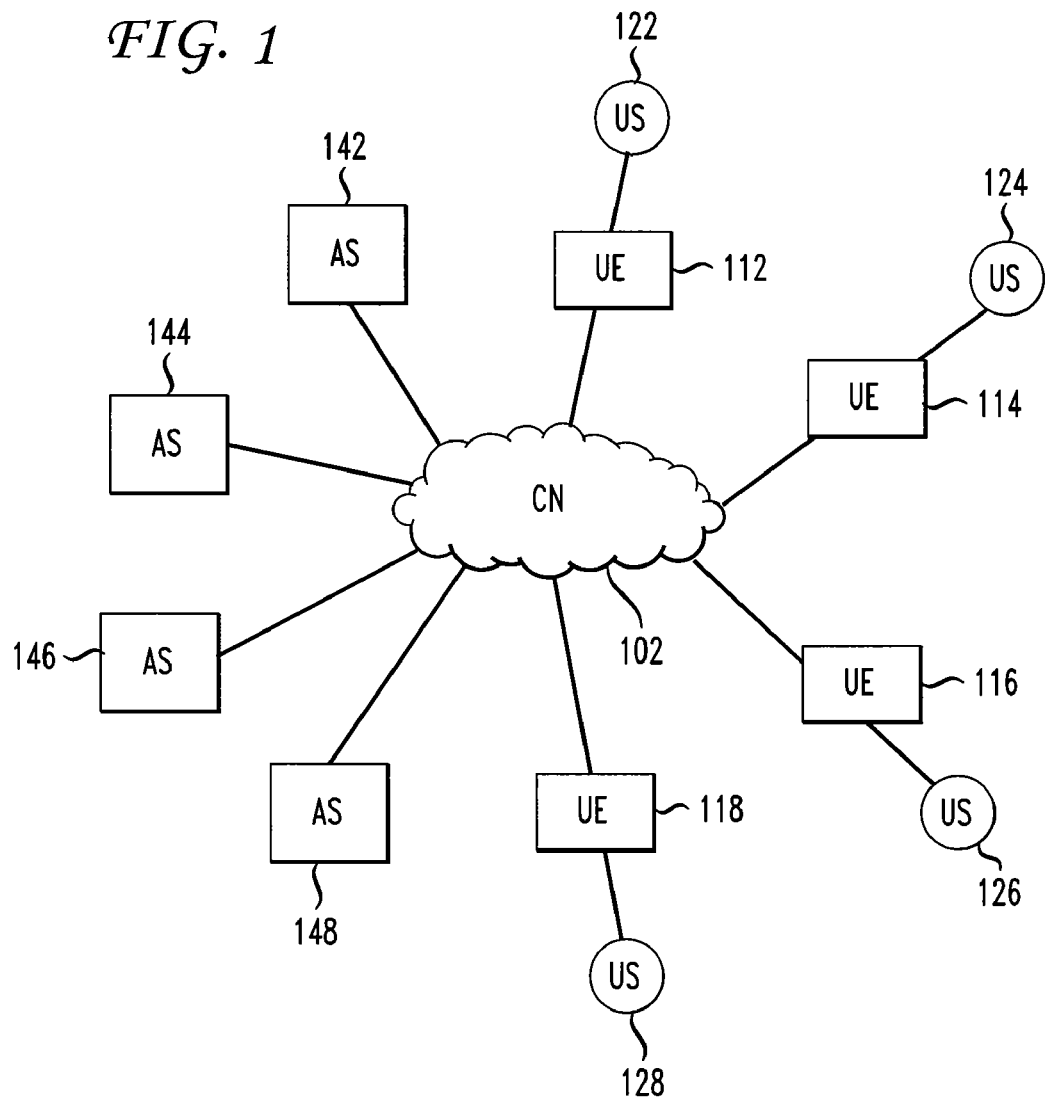
FIG. 1 shows a high-level schematic of a telecommunications network.

FIG. 1 shows a high-level schematic of an example of a telecommunications network that serves as the infrastructure for supporting online access, collection, storage, and exchange of multimedia content. A telecommunications network includes the network equipment, network operations software, and communications links for users to communicate with each other and for users to access applications. Users US 122-US 128 connect to core network CN 102 via user equipment UE 112-UE 118, respectively. A personal computer (PC) is an example of user equipment. Application servers AS 142-AS 148 provide various user applications. For example, AS 142 is hosted by an Internet service provider (ISP) and provides basic services such as e-mail and web access. AS 144 is hosted by a multimedia content provider. AS 146 is hosted by a multimedia access service provider. AS 148 is hosted by an online social networking provider. As discussed above, user equipment UE 112-UE 118 may also serve as application servers. In an embodiment of the invention, users US 122-US 128 may communicate with each other and may access user applications on applications servers AS 142-AS 148 and user equipment UE 112-UE 118 via the Internet. Herein, Internet also refers to private networks.

Herein, multimedia (MM) refers to any information which may be processed by a computer. Multimedia includes stored computer-readable files, such as data files, text files, still images, audio files, and video files. Multimedia further includes live (real-time or near-real-time) presentations, such as streaming data, streaming text, streaming audio, and streaming video. Herein, the term multimedia content refers to a specific multimedia instance, such as a specific stored multimedia file or a specific live presentation. Multimedia content is identified by an associated (or corresponding) uniform resource locator (URL). Herein, an application accesses multimedia content via the URL associated with (or corresponding to) the multimedia content. Herein, managing multimedia content refers to a set of operations for processing multimedia content. The set of operations include, but are not limited to, searching for, collecting, viewing, saving, storing, indexing, filing, copying, deleting, organizing, sharing, and exchanging multimedia content. One skilled in the art may develop additional operations for processing multimedia content for specific applications.

Figure 2:
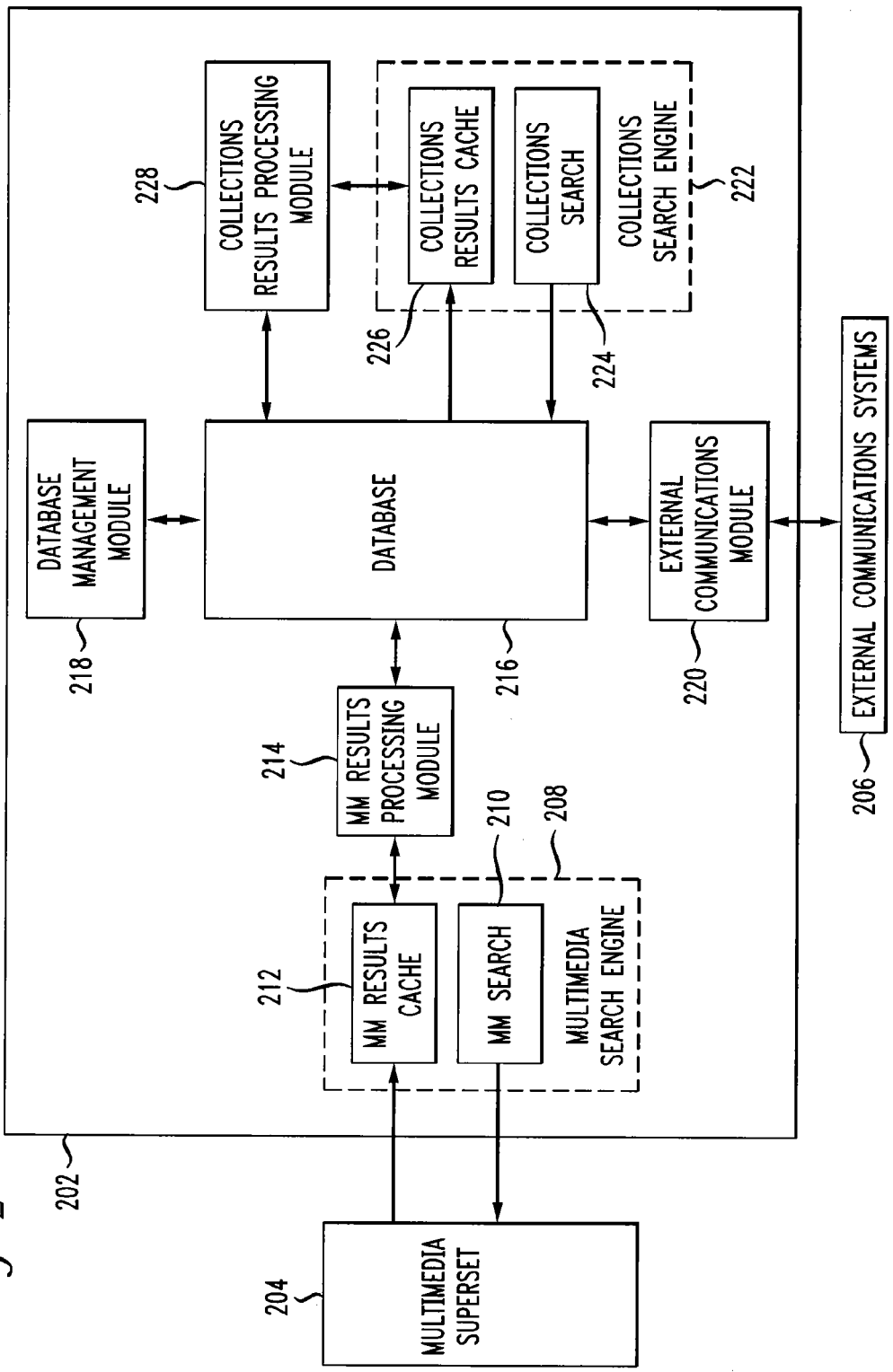
FIG. 2 shows a high-level schematic of a multimedia access system.

In an embodiment of the invention, as shown in FIG. 2, a user accesses multimedia content via a MM access system (MMAS) 202, which may be hosted by a MM access service provider on an application server, such as AS 146 mentioned above. MMAS 202 interfaces with MM superset 204 and external communications systems 206. Not shown are other interfaces, such as application programming interfaces and user interfaces. One skilled in the art may develop specific application programming interfaces and specific user interfaces for specific embodiments of the invention. MM superset 204 represents the superset of all MM content which may be accessed by a user over the Internet. In general, MM superset 204 comprises millions of elements (an element of MM superset 204 refers to MM content). Access to MM content may be public (open to any user) or private (restricted to specified users). External communications systems 206 are discussed further below.

Herein, user US 122 (FIG. 1) is designated as a representative user in the examples discussed below. In an embodiment of the invention, US 122 may access MMAS 202 over the Internet via user equipment UE 112 and may execute commands (perform functions or operations) on MMAS 202 via a graphical user interface on UE 112. US 122, for example, may log onto a website hosted by a MM access service provider, which assigns a user account to US 122. Herein, a user account refers to a set of software and hardware resources. For example, a user account may provide the software resources for performing the MM access services described below and for performing additional communications services such as e-mail and posting to websites. A user account may also provide storage space on a disk drive to store user information. MMAS 202 supports multiple user accounts, with a specific user account assigned to a specific user. Herein, a user accesses MMAS 202 via a user account.

Figure 3:
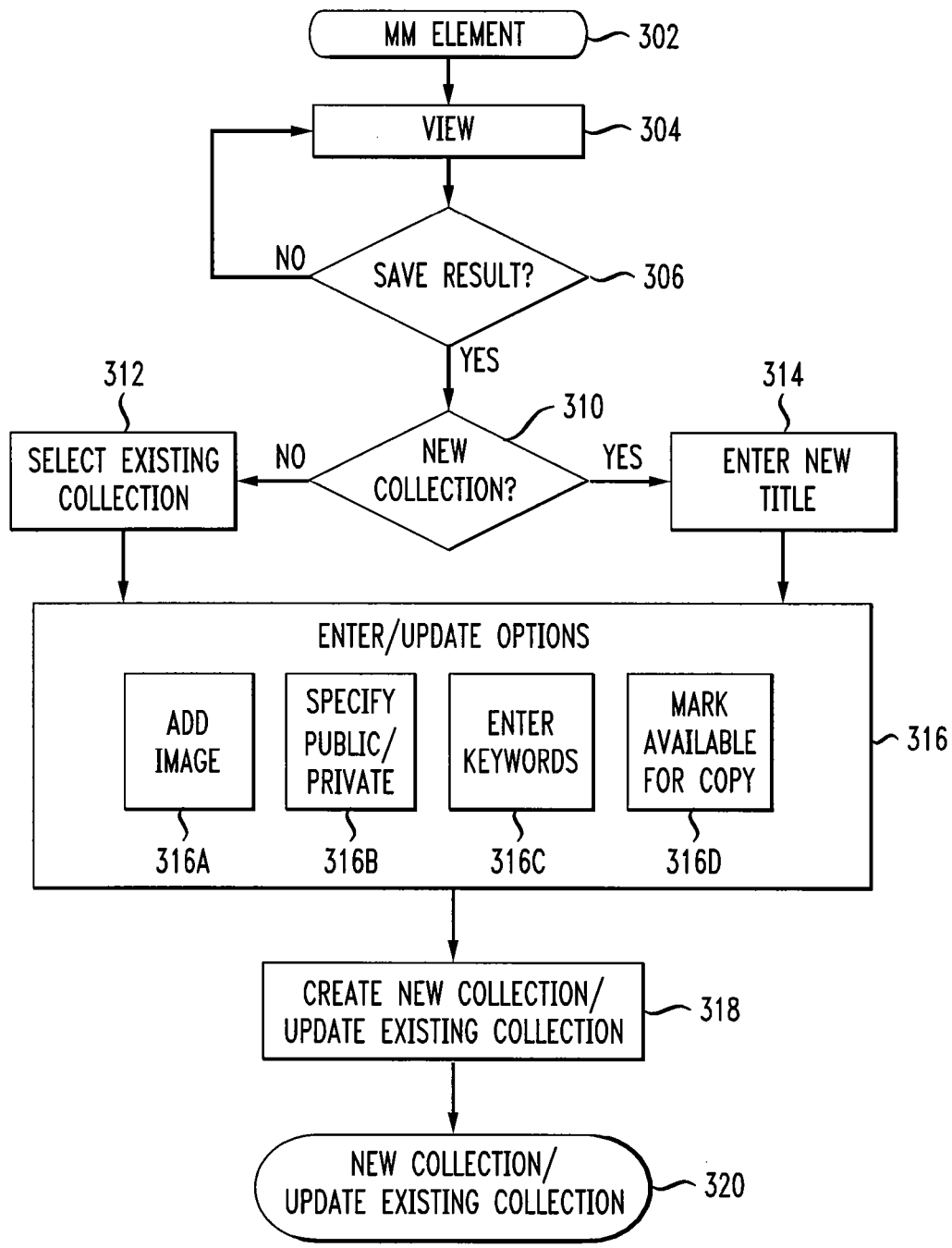
FIG. 3 shows a flowchart of steps for creating or updating a collection.

MMAS 202 enables US 122 to search for specific MM content of interest from among the elements of MM superset 204. The URLs of specific MM content of interest may then be processed and stored in database structures referred to herein as collections. User operations (described below) may then be performed on the collections. The process of constructing a collection is described with reference to the high-level schematic in FIG. 2 and the flowchart in FIG. 3. In FIG. 2, US 122 first accesses MM search engine 208 to find MM content of interest. US 122 enters MM search terms into MM search module 210. For example, if US 122 is searching for videos by a particular singer, US 122 may enter <"Name of Singer">, along with other delimiters such as type of multimedia <"Videos Only"> and date of performance <"1998-2008">, into MM search module 210, which then searches MM superset 204 for MM content correlated to the MM search terms. The MM results of the MM search are stored in MM results cache 212. The MM elements in MM results cache 212 comprise URLs corresponding to specific MM content. An MM element in MM results cache 212 may also include an associated small image (thumbnail) of the singer and associated supplementary information (for example, "Clip from Live Concert. Madison Square Garden. New York. Nov. 5, 2008").

The MM elements in MM results cache 212 are then processed by MM results processing module 214. The process steps are summarized in the flowchart shown in FIG. 3. In step 304, US 122 views (plays) one of the MM elements (labelled MM element 302) in MM results cache 212 by, for example, clicking on the URL or associated thumbnail. Herein, clicking refers to the process of using a mouse to position a cursor over an active display element (such as a "Play" button) on a graphical user interface and operating a switch on the mouse to execute the command (such as "Play Video") associated with the active display element. After US 122 has viewed MM element 302, the process passes to step 306, in which US 122 decides whether or not to save MM element 302. If US 122 decides to not save MM element 302, then US 122 may return to step 304 to view another MM element, or stop.

If US 122 decides to save MM result 302, then the process passes to step 310, in which US 122 decides whether or not to create a new collection. Details of a collection are discussed further below. If US 122 decides to create a new collection, then the process passes to step 314, and US 122 enters a title for the new collection. If US 122 decides to not create a new collection, then the process passes to step 312, and US 122 selects an existing collection. After step 314 or step 312, the process then passes to step 316, in which US 122 enters options for a new collection or updates options for the selected existing collection. Options include:

Add image 316A. A thumbnail associated with the collection may be added as a graphic identifier.

Specify public/private 316B. A public collection may be accessed by any user; a private collection has restricted access.

Enter keywords 316C. Keywords may be used for indexing collections and for searching for collections. Keywords, for example, may include <"Name of Singer">, <"Song Title">, <"Venue">, and <"Date of Performance">.

Mark available for copy. If a collection is available for copy, another user may copy the collection. This feature is discussed in more detail below.

One skilled in the art may include other options to provide additional functions.

The process then passes to step 318. If the collection is a new collection, a new collection 320 containing MM element 302 is created. If the collection is a selected previous collection, an updated existing collection 320 containing MM element 302 is saved. Step 304-step 318 may then be iterated for the remaining MM elements in MM results cache 212.

Figure 4:
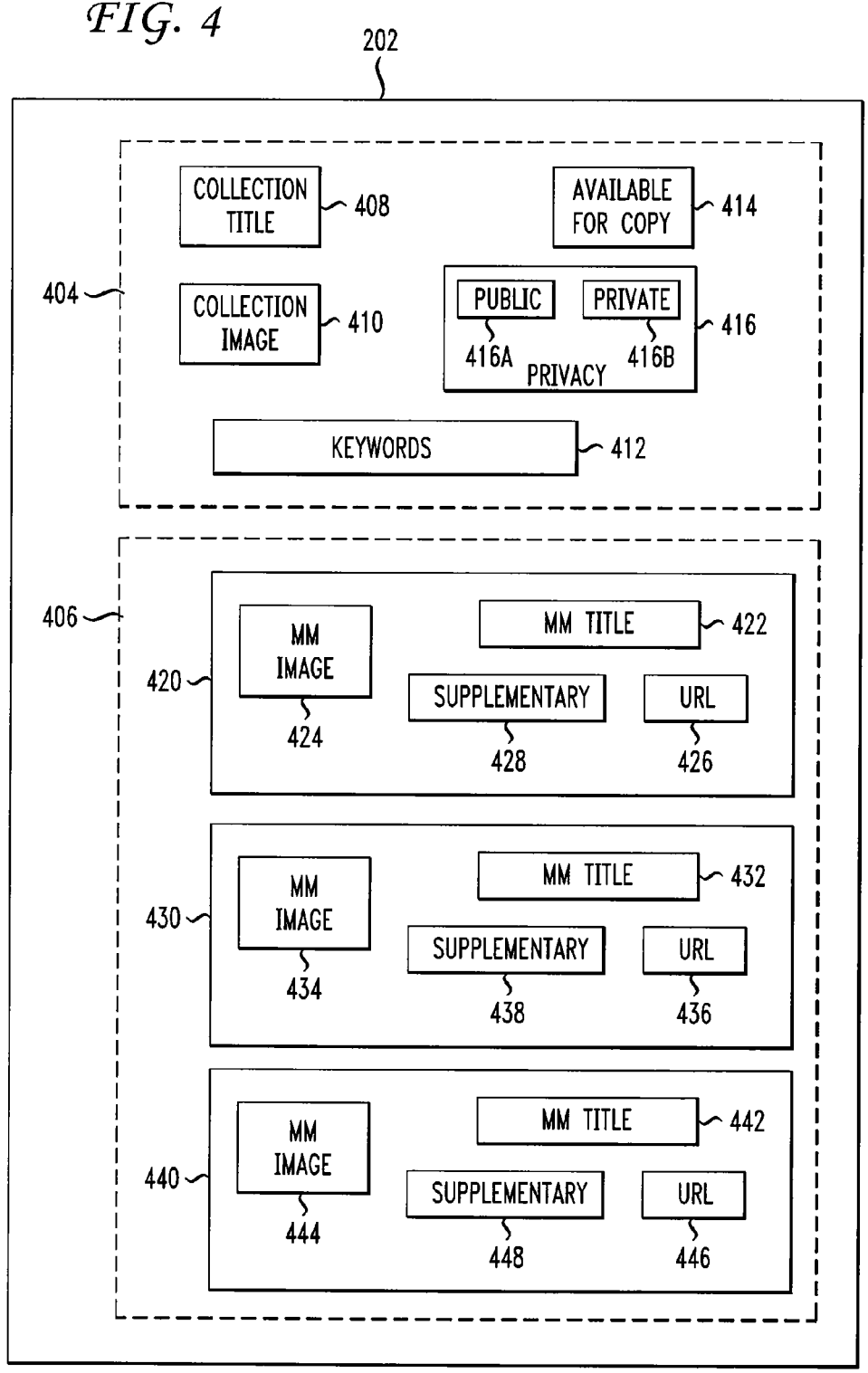
FIG. 4 shows a schematic of a collection page.

FIG. 4 shows a high-level schematic of a collection page 402, which is a graphical representation of the database structure of an individual collection. Collection page 402, for example, may be displayed on a monitor in UE 112 (FIG. 1) and viewed by US 122. Collection page 402 comprises two main fields, identifiers and features (IF) field 404 and MM content field 406. Identifiers and features associated with the collection are contained within identifier fields and feature fields. Examples of identifier fields and feature fields contained within IF field 404 include the collection title field 408, which contains the title of the collection, and the collection image field 410, which contains an associated graphical identifier (also referred to as a thumbnail or icon) for the collection. Keywords, used for indexing and searching, are entered in keywords field 412. Available for copy feature field 414 specifies whether the collection may be copied by other users. Privacy feature field 416 specifies whether the collection is public 416A (collection may be accessed by any user) or private 416B (restricted access). One skilled in the art may include other identifiers and features in IF field 404.

MM content field 406 contains a MM content element (MMCE) for each MM content stored in the collection. Shown are three representative MMCEs, MMCE 420, MMCE 430, and MMCE 440. Each MMCE contains various fields. For example, MMCE 420 contains MM title field 422, which contains the MM title of the MMCE, and MM image field 424, which contains an associated graphical identifier for the MMCE. The URL for the MM content associated with MMCE 420 is specified in the URL field 426. Supplementary information field 428 contains supplementary information, such as a description of the MM content, the date on which the MM content was created, and the number of times the MM content has been viewed. One skilled in the art may include other information fields in MMCE 420. Similarly, MMCE 430 contains MM title field 432, MM image field 434, URL field 436, and supplementary information field 438; and MMCE 440 contains MM title field 442, MM image field 444, URL field 446, and supplementary information field 448.

Figure 5:
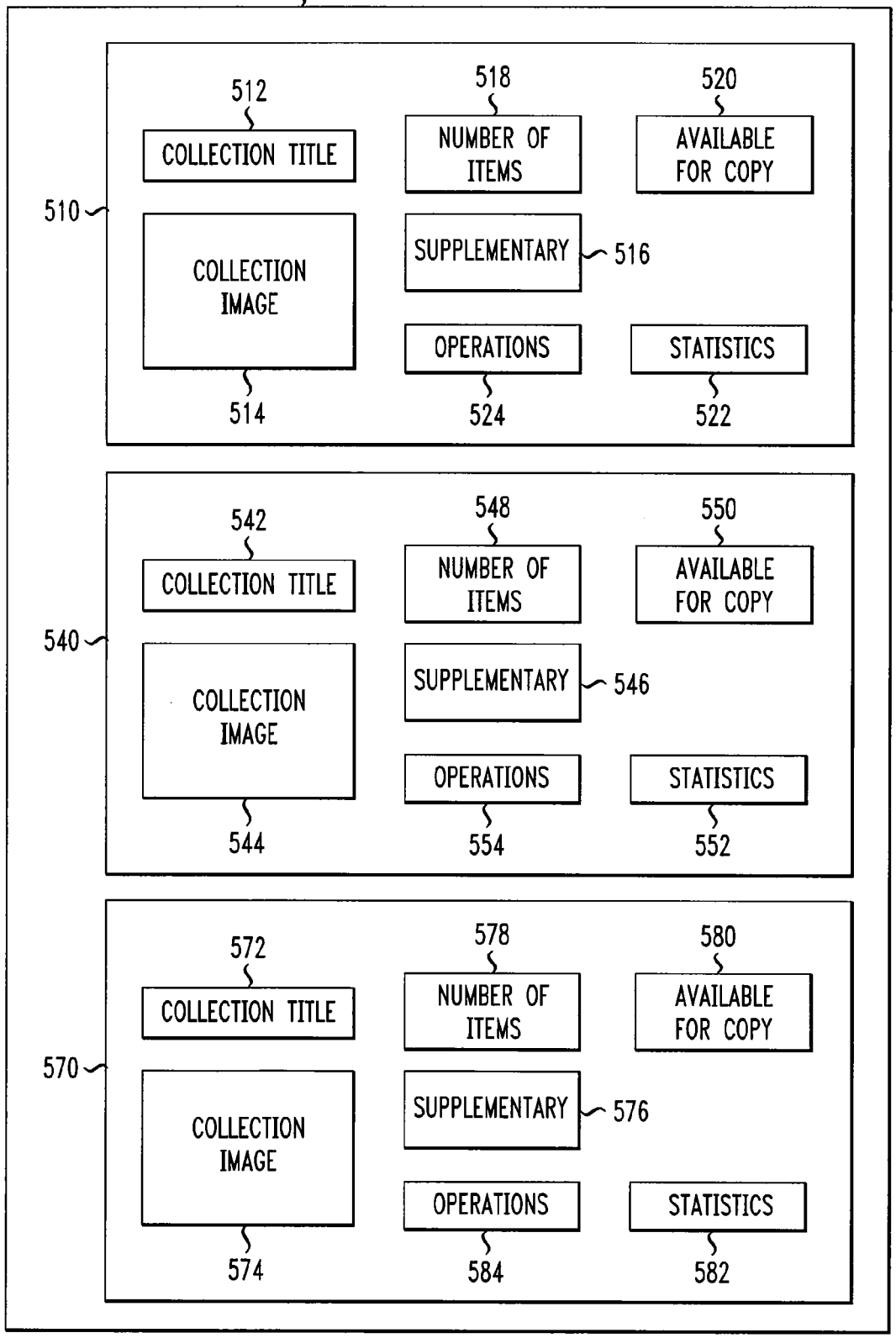
FIG. 5 shows a schematic of a collection set page.

FIG. 5 shows a high-level schematic of a collection set page 502, which is a graphical representation of the database structure of a set of collections (referred to as a collection set). Collection set page 502, for example, may be displayed on a monitor in UE 112 and viewed by US 122. Collection set page 502 comprises a separate field for each collection element (CE) in the collection set. Shown are three representative collection elements, CE 510, CE 540, and CE 570. Each CE contains various fields. For example, CE 510 contains collection title field 512, which contains the title of the collection, and collection image field 514, which contains an associated graphical identifier for the collection. Supplementary information field 516 contains supplementary information, such as a description of the collection and the date on which the collection was created. Number of items field 518 contains the number of MM content elements stored in CE 510. Available for copy field 520 specifies whether CE 510 may be copied by other users. Statistics field 522 contains statistics such as the number of times that CE 510 has been viewed, bookmarked, copied, or commented on. Operations field 524 lists the user operations which may be performed on CE 510. These user operations are discussed in greater detail below. One skilled in the art may include other information fields in CE 510. Similarly, CE 540 contains collection title field 542, collection image field 544, supplementary information field 546, number of items field 548, available for copy field 550, statistics field 552, and operations field 554; and CE 570 contains collection title field 572, collection image field 574, supplementary information field 576, number of items field 578, available for copy field 580, statistics field 582, and operations field 584.

In an embodiment of the invention, a collection page may be a personal collection page or a public collection page. A personal collection page displays the personal collections belonging to a specific user (the owner of the personal collections). A personal collection is created by the owner (or copied by the owner from another collection; see discussion below). Herein, a personal collection is assigned to the user account of the owner. Collections on a public collection page are created by any user. The owner of a specific collection designates whether the specific collection may be publicly accessible by other users. Herein, other users refer to users other than the owner. As discussed below, the owner may perform one set of operations on a personal collection and may perform another set of operations on a public collection.

Figure 6:
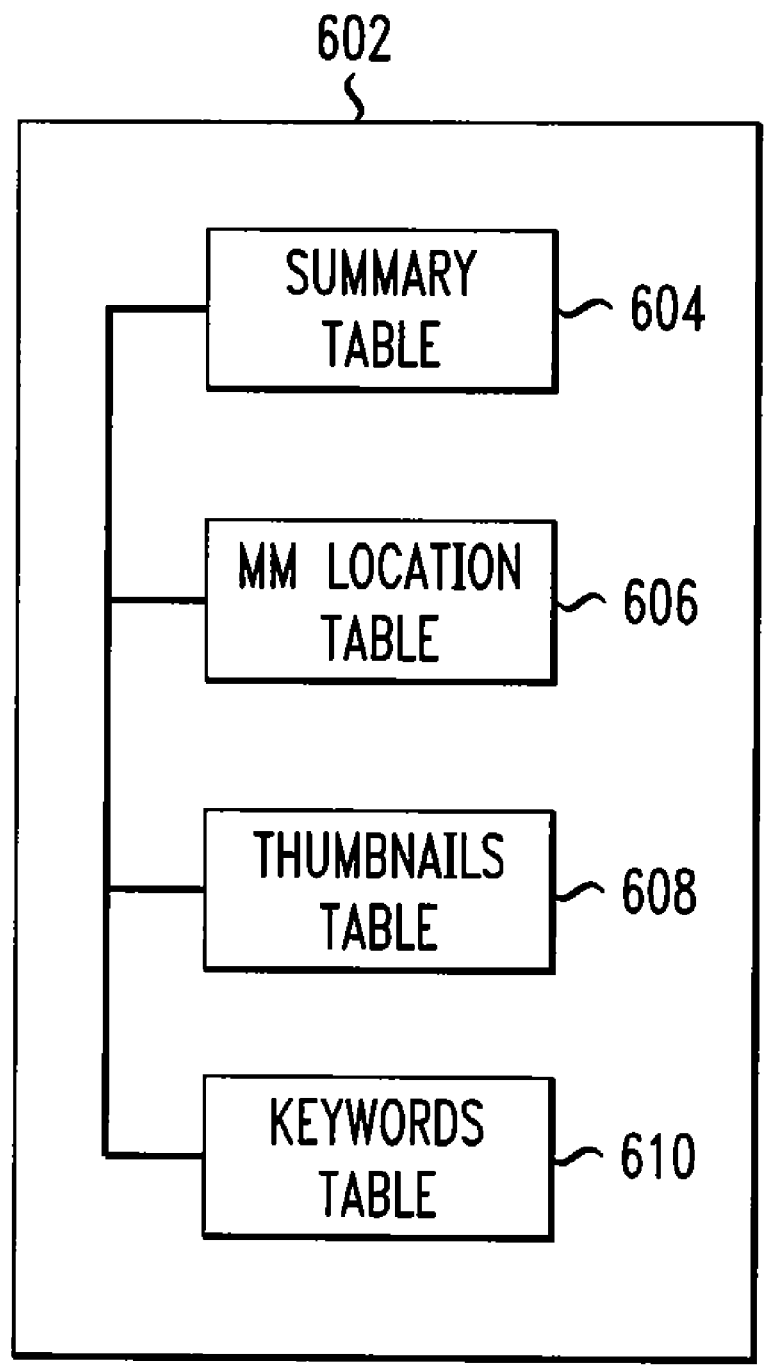
FIG. 6 shows a schematic of a database structure.

The information displayed on collection page 402 and collection set page 502 are stored in database 216 (FIG. 2) and managed by database management module 218. Collections are stored in database 216. Herein, database 216 comprises collections and cross-correlated information. FIG. 6 shows the high-level schematic of database structure 602 used to manage the information, according to an embodiment of the invention. Database structure 602 comprises four tables: summary table 604, MM location table 606, thumbnails table 608, and keywords table 610. The information in the tables are cross-correlated.

Summary table 604 contains the following information for each collection stored in database 216:
  User ID. The identification number of the user who created the collection.
  Collection ID. Identification number for the collection.
  Title of the collection.
  Public. Indicates if the collection is available for other users to view.
  Copy. Indicates if the collection can be copied by other users.
  Created. Date on which the collection was created.
  Views. Number of times the collection was viewed by other users.
  Added. Number of times the collection was bookmarked by other users.
  Copied. Number of times the collection was copied by other users.
  Position. Order in which the collection appears.
  Flag. Number of times the collection was marked as inappropriate by other users.

One skilled in the art may provision summary table 604 with additional information fields.

The contents of the other tables are as follows. A thumbnail (small image) associated with each collection is stored in thumbnails table 608. Keywords (also referred to as tags) associated with each collection are stored in the keywords table 610. MM location table 606 contains the sets of URLs of the MM content within each collection. In an embodiment, a collection may be identified by an associated (or corresponding) URL. Herein, an application may access a collection via the URL associated with (or corresponding to) the collection. The URLs associated with (or corresponding to) the collections may also be stored in MM location table 606 or stored in a separate table.

In an embodiment of the invention, a user may search, store, and perform operations on entire collections (private or public). Processing a collection of MM content elements, instead of processing individual MM content elements, may be advantageous because a collection may contain large numbers (for example, hundreds or thousands) of MM content elements. Instead of constructing a new collection for a favorite singer, for example, a user may view or copy (if allowed) public collections created by other users.

Figure 7:
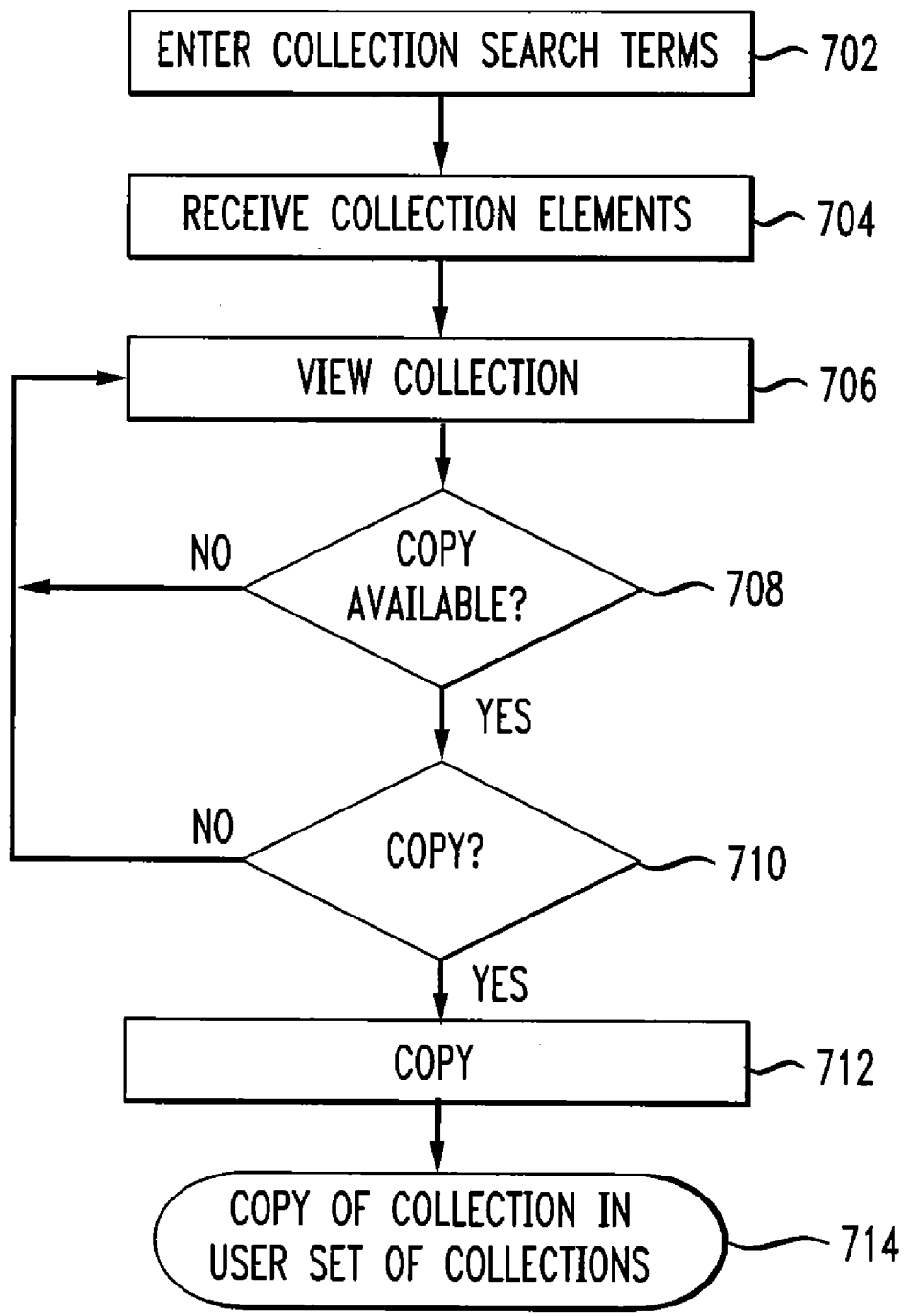
FIG. 7 shows a flowchart of steps for searching for collections.

Processes for searching, storing, and performing operations on collections are described with reference to the high-level schematic in FIG. 2 and the flowchart in FIG. 7. US 122 first accesses collections search engine 222 (FIG. 2) to find collections of interest. In step 702, US 122 enters collections search terms into collections search module 224. For example, if US 122 is interested in performances by a singer, US 122 may enter <"Name of Singer"> and <"Date of Performance"> in collections search module 224, which then searches database 216 for public collections correlated to the collections search terms. Correlation, for example, may be based on matches between the collections search terms and the title and keywords associated with a public collection. The results of the collections search are stored in collections results cache 226. The elements of collections results cache 226 comprise collection elements (as previously discussed with respect to FIG. 5), which are then processed by collections results processing module 228.

In step 704, US 122 receives the collection elements. The process then passes to step 706, in which US 122 views one of the collections. After viewing, the process passes to step 708, in which US 122 checks whether the collection may be copied. If copy is not available, then US 122 may return to step 706 and view another collection, or stop. If copy is available, then the process passes to step 710, in which US 122 decides whether to copy the collection or not. If US 122 decides to not copy the collection, then US 122 may return to step 706 and view another collection, or stop. If US 122 decides to copy the collection, then the process passes to step 712, in which US 122 copies the collection. The result is a collection copy 714, which now becomes a personal collection of US 122; that is, US 122 becomes the owner of collection copy 714. Collection copy 714 is copied to the user account of US 122.

Figure 8A:
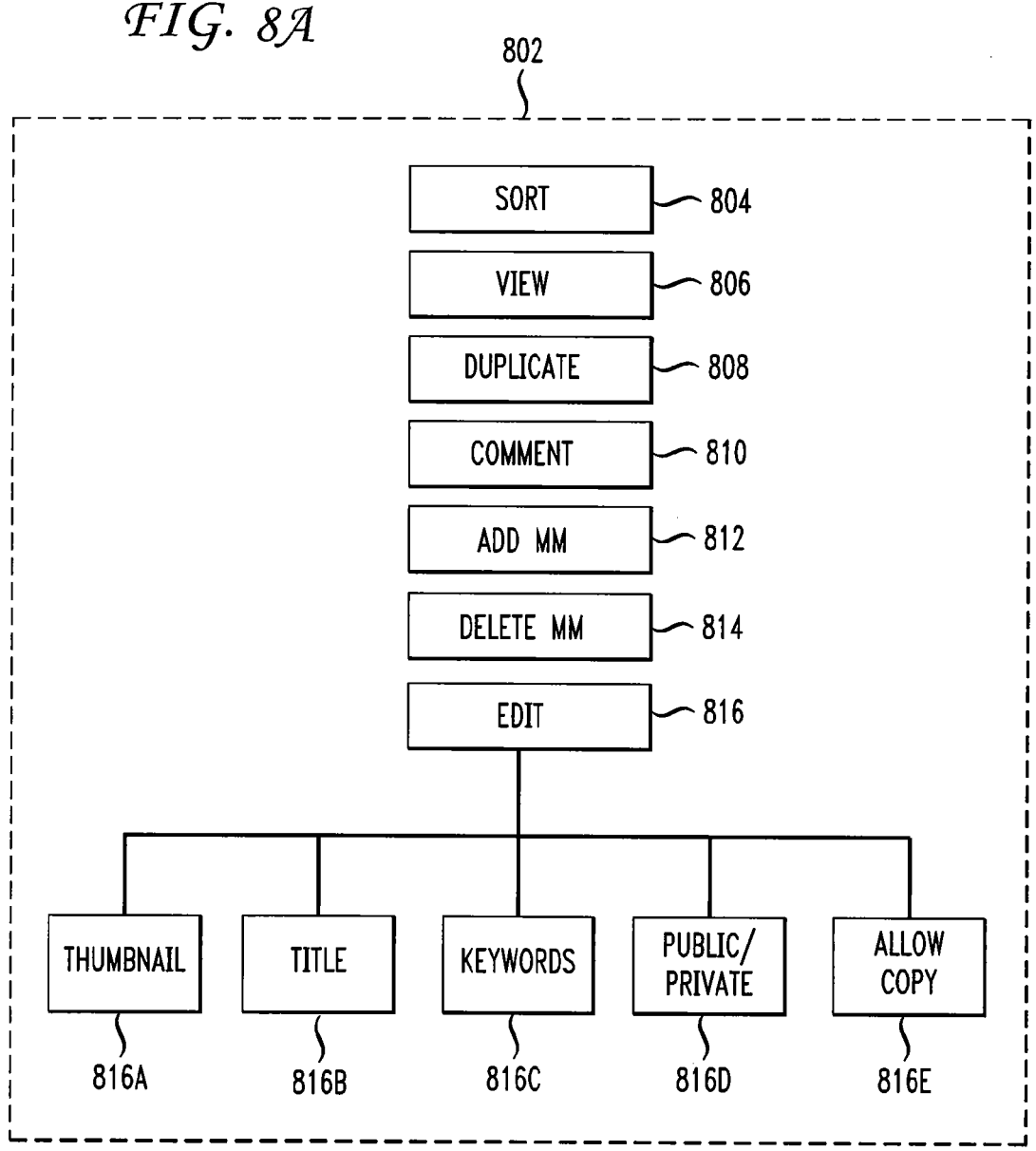
FIG. 8A summarizes the set of operations which may be performed on a personal collection.

FIG. 8A summarizes the personal operations set 802 which US 122 may perform on his own personal collection set. Sort operation 804 sorts the order in which the collections are displayed (for example, the order of presentation of collection elements CE 510, CE 540, and CE 570 on collection set page 502 in FIG. 5). CE 510, CE 540, and CE 570 may be sorted according to attributes specified by US 122. Examples of attributes include title, date created, number of times viewed, number of times bookmarked, number of times copied, and number of times commented on. View operation 806 allows US 122 to view a collection. Duplicate operation 808 creates a duplicate (local copy) of a collection. The duplicate collection may then be processed into a new collection. For example, the duplicate collection may be given a new title, existing MM content elements may be deleted, and new MM content elements may be added. Comment operation 810 allows US 122 to enter comments on the collection. Operation add MM 812 adds a new MM content element to the collection. This operation was previously described with respect to FIG. 3. Delete MM 814 deletes a MM content element from the collection. Edit operation set 816 provides a set of operations for editing the collection. Fields which may be edited include thumbnail 816A, title 816B, keywords 816C, public/private classification 816D, and allow copy permission 816E. One skilled in the art may provide additional edit operations and additional personal operations.

Figure 8B:
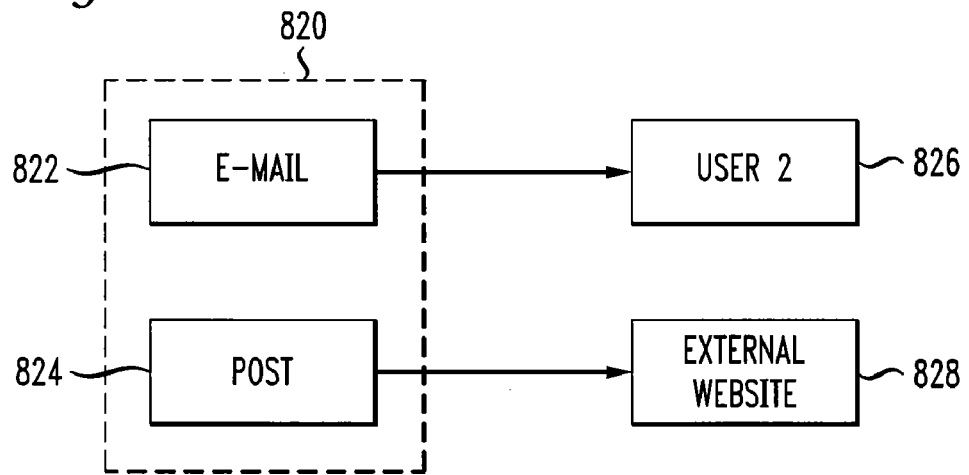
FIG. 8C summarizes the set of external communications operations.

FIG. 8B summarizes the external communications operations set 820 which US 122 may perform on his personal collections. External communications operations set 820 uses external communications module 220 to communicate with external communications systems 206. E-mail operation 822 embeds the URL of a collection in an e-mail, which is sent to user 2 826 (who may be, for example, user US 124 in FIG. 1). Herein, e-mail operation 822 is also referred to as e-mailing a collection or sending a collection in an e-mail. When US 124 opens the e-mail, he may click on the URL (or associated icon). A program is launched, which allows US 124 to view the collection via MMAS 202. Note that user 2 826 does not need a user account on MMAS 202 to view the collection. If user 2 826 does have a user account, however, he may perform other operations on the collection (see discussion of FIG. 8C below). Similarly, post operation 824 embeds the URL of a collection on an external website 828, which, for example, may be a blog or the personal page of US 122 on a social networking site. Herein, post operation 824 is also referred to as posting a collection. Clicking on the URL (or associated icon) launches a program to view the collection. Note that a user does not need a user account on MMAS 202 to view the posted collection. If the user does have a user account, however, he may perform other operations on the collection (see discussion of FIG. 8C below). One skilled in the art may provide additional external communications operations.

Figure 8C:
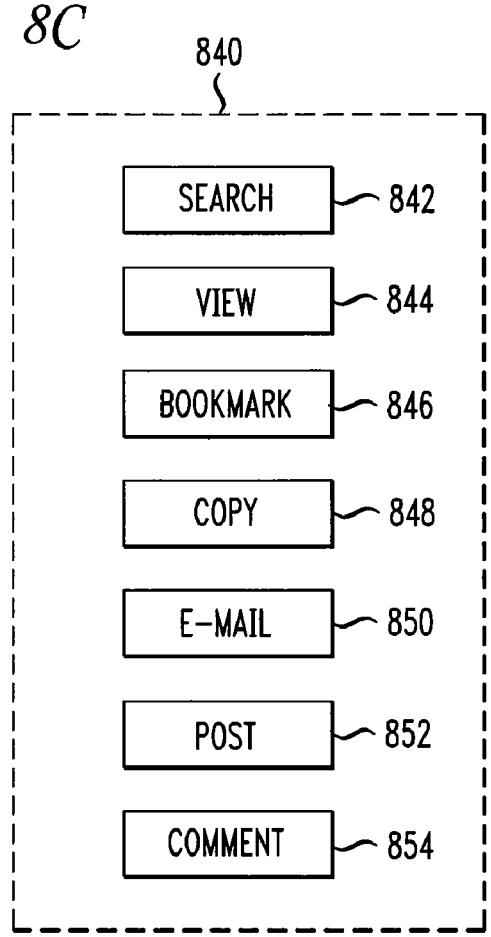

FIG. 8C summarizes the public operations set 840 which US 122 may perform on public collections owned by other users: search operation 842, view operation 844, bookmark operation 846, copy operation 848, e-mail operation 850, post operation 852, and comment operation 854. One skilled in the art may provide additional public operations.

Figure 9:
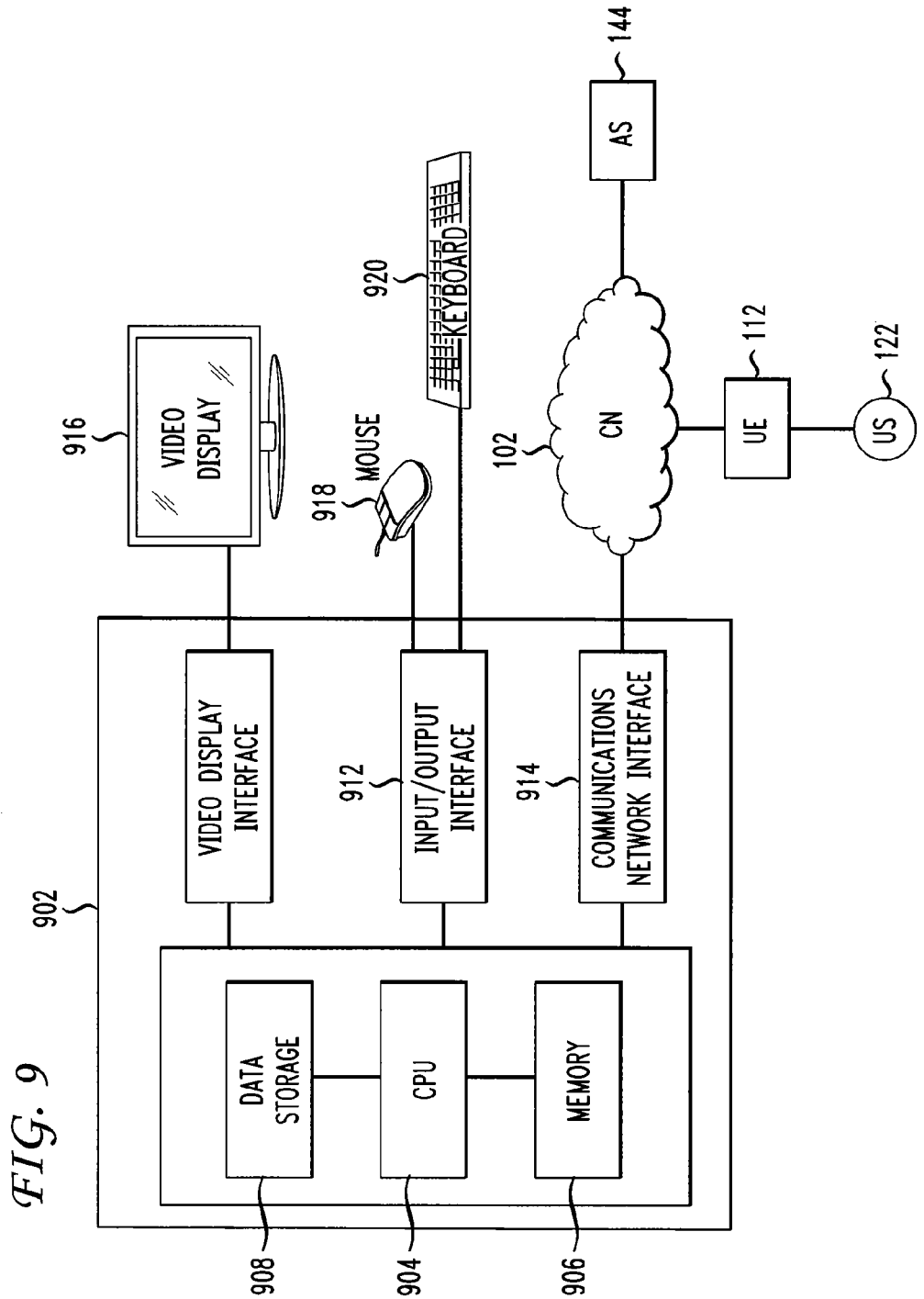
FIG. 9 shows a high-level schematic of a computer which may be used to implement a multimedia access system.

One embodiment of a MMAS 202 (FIG. 2) may be implemented using a computer. As shown in FIG. 9, computer 902 may be any type of well-known computer comprising a central processing unit (CPU) 904, memory 906, data storage device 908, and user input/output interface 912. Data storage device 908 may comprise a hard drive, non-volatile memory, or other computer readable medium (such as a magnetic disk or compact disc read only memory). User input/output interface 912 may comprise connections to user input/output devices, such mouse 918 and keyboard 920, which enable a user to operate computer 902. In this instance, a user may be a network administrator for a MM access service provider which operates MM access system 202. A network administrator may also operate computer 902 remotely over core network CN 102 (see below).

As is well known, a computer operates under control of computer software which defines the overall operation of the computer and applications. CPU 904 controls the overall operation of the computer and applications by executing computer program instructions which define the overall operation and applications. The computer program instructions may be stored in data storage device 908 and loaded into memory 906 when execution of the program instructions is desired. The method steps shown in the flowchart in FIG. 3 or in the flowchart in FIG. 7 may be defined by computer program instructions stored in the memory 906 or in the data storage device 908 (or in a combination of memory 906 and data storage device 908) and controlled by the CPU 904 executing the computer program instructions. For example, the computer program instructions may be implemented as computer executable code programmed by one skilled in the art to perform algorithms implementing the method steps shown in the flowchart in FIG. 3 or in the flowchart in FIG. 7. Accordingly, by executing the computer program instructions, the CPU 904 executes algorithms implementing the method steps shown in the flowchart in FIG. 3 or in the flowchart in FIG. 7.

Computer 902 may further comprise a video display interface 910, which transform signals from CPU 904 to signals which drive video display 916. Computer 902 may further comprise one or more network interfaces. For example, communications network interface 914 comprises a connection to core network CN 102 (FIG. 1). User US 122 may use user equipment UE 112 to communicate with computer 902 via CN 102. The MMAS 202 implemented on computer 902 may search for multimedia content on application server 144 (hosted by a MM content provider), for example, via CN 102.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for managing multimedia content, comprising:

assigning, at a processor communicatively coupled to a digital data storage, a first user account to a first user;

receiving, via an application programming interface communicatively coupled to the processor, a search request for multimedia content from the first user;

determining, by the processor in cooperation with the digital data storage, uniform resource locators corresponding to the search request;

storing, by the digital data storage, the uniform resource locators to a collection in a multimedia access system, wherein the multimedia access system is accessible via the first user account and wherein the digital data storage is configured to store a plurality of collections associated with user accounts, the collection further comprising a description of the collection and a creation date of the collection;

assigning, by the processor in cooperation with the digital data storage, the collection with the first user account in response to receiving a request from the first user to create a new collection;

receiving, via the application programming interface, a request from a second user account assigned to a second user to copy the collection to the second user account;

determining, by the processor, whether the collection is marked as public or private and whether the collection can be copied by the second user account;

determining, by the processor, that the collection is marked as public and a copy of the collection is available;

in response to determining that the collection is marked as public and the copy of the collection is available, allowing copying of, by the processor, the copy of the collection to the second user account;

determining, by the processor, that the collection is marked as private; and in response to determining that the collection is marked as private, determining, by the processor, that the copy of the collection has restricted access and the copy of the collection is not available;

wherein when a collection search term from the first user account is received, the assigning further comprises:
determining, from each collection assigned to the first user account, a collection associated with the collection search term.

2. The method of claim 1 wherein the plurality of uniform resource locators is defined as a first plurality of uniform resource locators and the collection is defined as a first collection, the method further comprising:
receiving, via the application programming interface communicatively coupled to the processor, a second plurality of uniform resource locators;
storing, by the digital data storage, the second plurality of uniform resource locators to a second collection; and
assigning, by the processor in cooperation with the digital data storage, the second collection to the first user account.

3. The method of claim 1 wherein the plurality of uniform resource locators is defined as a first plurality of uniform resource locators and the collection is defined as a first collection, the method further comprising:
receiving, via an application programming interface communicatively coupled to the processor, a second plurality of uniform resource locators;
storing, by the digital data storage, the second plurality of uniform resource locators to a second collection; and
assigning, by the processor in cooperation with the digital data storage, the second collection to the second user account.

4. The method of claim 1 wherein the collection is defined as a first collection, the method further comprising:
sending, by the processor via an application programming interface, the first collection in an e-mail message.

5. The method of claim 1 wherein the collection is defined as a first collection, the method further comprising:
posting by the processor, the first collection.

6. The method of claim 1, further comprising:
receiving, by the processor, a multimedia search term; and
searching, by the processor in cooperation with the digital data storage, a plurality of multimedia content for a specific multimedia content based in part on the multimedia search term.

7. The method of claim 1, further comprising:
searching, by the processor in cooperation with the digital data storage, for a specific collection in the plurality of collections, the specific collection based in part on the collection search term; and
retrieving, by the processor in cooperation with the digital data storage, the collection associated with the collection search term.

8. The method of claim 7, further comprising:
storing, by the digital data storage, the specific collection to a specific user account in the plurality of user accounts.

9. An apparatus for managing multimedia content, comprising a processor, a digital data storage, an application programming interface, wherein the processor, digital data storage, application programming interface are communicatively coupled, the digital data storage storing computer program instructions, which, when executed on the processor, cause the processor to perform operations comprising:
assigning a first user account to a first user;
receiving a search request for multimedia content from the first user;
determining uniform resource locators corresponding to the search request;
storing the uniform resource locators to a collection in a multimedia access system, wherein the multimedia access system is accessible via the first user account and wherein the digital data storage is configured to store a plurality of collections associated with user accounts, the collection further comprising a description of the collection and a creation date of the collection; and
assigning by the processor in cooperation with the digital data storage, the collection to the first user account in response to receiving a request from the first user to create a new collection;
receiving a request from a second user account assigned to a second user to copy the collection to the second user account;
means for determining whether the collection is marked as public or private and whether the collection can be copied by the second user account; and
determining that the collection is marked as public and a copy of the collection is available;
in response to determining that the collection is marked as public and the copy of the collection is available, allowing copying of the copy of the collection to the second user account;
determining that the collection is marked as private; and in response to determining that the collection is marked as private, determining that the copy of the collection has restricted access and the copy of the collection is not available;
wherein when a collection search term from the first user account is received, the assigning further comprises:
determining, from each collection assigned to the first user account, a collection associated with the collection search term.

10. The apparatus of claim 9 wherein the plurality of uniform resource locators is defined as a first plurality of uniform resource locators and the collection is defined as a first collection, the operations further comprising:
receiving a second plurality of uniform resource locators;
storing by the digital data storage, the second plurality of uniform resource locators to a second collection; and assigning the second collection to the first user account.

11. The apparatus of claim 9 wherein the plurality of uniform resource locators is defined as a first plurality of uniform resource locators and the collection is defined as a first collection, the operations further comprising:
receiving a second plurality of uniform resource locators;
storing by the digital data storage, the second plurality of uniform resource locators to a second collection; and
assigning by the processor in cooperation with the digital data storage, the second collection to the second user account.

12. The apparatus of claim 11, the operations further comprising:
copying the first collection to the second user account.

13. The apparatus of claim 9 wherein the collection is defined as a first collection, further comprising:
sending the first collection in an e-mail message.

14. The apparatus of claim 9 wherein the collection is defined as a first collection, the operations further comprising:
posting the first collection.

15. The apparatus of claim 9, the operations further comprising:
searching, for a specific collection in the plurality of collections, the specific collection based in part on the collection search term; and
retrieving the collection associated with the collection search term.

16. The apparatus of claim 9, the operations further comprising:
storing the specific collection to a specific user account in the plurality of user accounts.

17. A computer readable medium storing computer program instructions for managing multimedia content, which, when executed on a processor, cause the processor to perform a method comprising:
assigning, at a processor communicatively coupled to a digital data storage, a first user account to a first user;
receiving, via an application programming interface communicatively coupled to the processor, a search request for multimedia content from the first user;
determining, by the processor in cooperation with a digital data storage, uniform resource locators corresponding to the search request;
storing, by the digital data storage, the uniform resource locators to a collection in a multimedia access system, wherein the multimedia access system is accessible via the first user account and wherein the digital data storage is configured to store a plurality of collections associated with user accounts, the collection further comprising a description of the collection and a creation date of the collection;
assigning, by the processor in cooperation with the digital data storage, the collection with the first user account in response to receiving a request from the first user to create a new collection;
receiving, via the application programming interface, a request from a second user account assigned to a second user to copy the collection to the second user account;
determining, by the processor, whether the collection is marked as public or private and whether the collection can be copied by the second user account;
determining, by the processor, that the collection is marked as public and a copy of the collection is available;
in response to determining that the collection is marked as public and the copy of the collection is available, allowing copying of, by the processor, the copy of the collection to the second user account;
determining, by the processor, that the collection is marked as private; and
in response to determining that the collection is marked as private, determining, by the processor, that the copy of the collection has restricted access and the copy of the collection is not available;
wherein when a collection search term from the first user account is received, the assigning further comprises:
determining, from each collection assigned to the first user account, a collection associated with the collection search term.

18. The computer readable medium of claim 17 wherein the plurality of uniform resource locators is defined as a first plurality of uniform resource locators and the collection is defined as a first collection, wherein the method further comprises:
receiving, via an application programming interface communicatively coupled to the processor, a second plurality of uniform resource locators;
storing, by the digital data storage, the second plurality of uniform resource locators to a second collection; and
assigning, the second collection to the first user account.

19. The computer readable medium of claim 17 wherein the plurality of uniform resource locators is defined as a first plurality of uniform resource locators and the collection is defined as a first collection, wherein the method further comprises:
receiving, via an application programming interface communicatively coupled to the processor, a second plurality of uniform resource locators;
storing by the digital data storage, the second plurality of uniform resource locators to a second collection; and
assigning, by the processor in cooperation with the digital data storage, the second collection to the second user account.

20. The computer readable medium of claim 17 wherein the method further comprises:
sending, by the processor, the first collection in an e-mail message.

21. The computer readable medium of claim 17 wherein the collection is defined as a first collection, wherein the method further comprises:
posting, by the processor, the first collection.

22. The computer readable medium of claim 17, wherein the method further comprises:
searching, by the processor in cooperation with the digital data storage, for a specific collection in the plurality of collections, the specific collection based in part on the collection search term; and
retrieving, by the processor in cooperation with the digital data storage, the collection associated with the collection search term.

23. The computer readable medium of claim 17, wherein the method further comprises:
storing, by the digital data storage, the specific collection to a specific user account in the plurality of user accounts.

* * * * *